(12) United States Patent
Soenksen et al.

(10) Patent No.: US 9,710,694 B2
(45) Date of Patent: Jul. 18, 2017

(54) IMAGE QUALITY FOR DIAGNOSTIC RESOLUTION DIGITAL SLIDE IMAGES

(71) Applicant: Leica Biosystems Imaging, Inc., Vista, CA (US)

(72) Inventors: Dirk G. Soenksen, Vista, CA (US); Cindy Perz, Vista, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 0 days.

(21) Appl. No.: 14/818,273

(22) Filed: Aug. 4, 2015

(65) Prior Publication Data

US 2016/0092722 A1    Mar. 31, 2016

Related U.S. Application Data

(62) Division of application No. 12/234,446, filed on Sep. 19, 2008, now Pat. No. 9,098,736.

(Continued)

(51) Int. Cl.

| G06K 9/00 | (2006.01) |
|---|---|
| G06T 5/00 | (2006.01) |
| G06T 5/50 | (2006.01) |
| G06T 7/00 | (2017.01) |
| A61B 5/08 | (2006.01) |

(52) U.S. Cl.
CPC ....... *G06K 9/00127* (2013.01); *G06K 9/0014* (2013.01); *G06T 5/003* (2013.01); *G06T 5/50* (2013.01); *G06T 7/0012* (2013.01); *G06T 2207/10024* (2013.01); *G06T 2207/10056* (2013.01); *G06T 2207/30024* (2013.01)

(58) Field of Classification Search
CPC ................ G06K 9/00; G06T 5/00; G06T 7/00

USPC ......... 382/128–134, 299; 600/300, 411, 425, 600/427, 532

See application file for complete search history.

(56) References Cited

U.S. PATENT DOCUMENTS

| 4,998,284 A | 3/1991 | Bacus et al. |
|---|---|---|
| 6,007,996 A * | 12/1999 | McNamara .......... C12Q 1/6841 382/129 |

(Continued)

FOREIGN PATENT DOCUMENTS

| JP | H10-274741 A | 10/1998 |
|---|---|---|
| JP | 2002-340677 A | 11/2002 |

(Continued)

OTHER PUBLICATIONS

Imagery Resolution Assessments and Reporting Standards (IRARS) Committee, Civil NIIRS Reference Guide, Mar. 1996, in 25 pages.

(Continued)

*Primary Examiner* — Abolfazl Tabatabai
(74) *Attorney, Agent, or Firm* — Procopio, Cory, Hargreaves & Savitch LLP

(57) ABSTRACT

An improved diagnostic resolution of digital slide images is obtained by scanning a first digital slide image at diagnostic resolution that is then deconvolved into separate images with one stain per image. The single stain images are then enhanced with image adjustments and/or processed with image analysis algorithms. The resulting single image data sets from the image analysis algorithms can then be stored. Additionally, the resulting enhanced single images can be recombined into a second digital slide image at diagnostic resolution that is also enhanced.

5 Claims, 13 Drawing Sheets

Related U.S. Application Data

(60) Provisional application No. 60/974,337, filed on Sep. 21, 2007.

(56) References Cited

U.S. PATENT DOCUMENTS

| | | | |
|---|---|---|---|
| 6,996,549 B2 * | 2/2006 | Zhang | G06K 9/623 706/12 |
| 7,035,478 B2 | 4/2006 | Crandall et al. | |
| 7,400,776 B2 | 7/2008 | Kjeldsen et al. | |
| 9,098,736 B2 | 8/2015 | Soenksen et al. | |
| 2006/0127880 A1 | 6/2006 | Harris et al. | |
| 2006/0245630 A1 | 11/2006 | Zahniser et al. | |
| 2007/0053573 A1 | 3/2007 | Rabinovich | |
| 2009/0245612 A1 | 10/2009 | Zahniser et al. | |
| 2009/0247416 A1 * | 10/2009 | Can | G01N 21/6452 506/7 |

FOREIGN PATENT DOCUMENTS

| | | |
|---|---|---|
| JP | 2005-530138 A | 10/2005 |
| JP | 2006-519443 A | 8/2006 |
| JP | 2006-526783 A | 11/2006 |
| KR | 10-1998-79747 | 11/1998 |
| KR | 10-2001-60238 | 7/2001 |
| WO | 03105675 A2 | 12/2003 |
| WO | 2004077338 A2 | 9/2004 |
| WO | 2004111930 A2 | 12/2004 |
| WO | 2009039450 A1 | 3/2009 |

OTHER PUBLICATIONS

International Search Report and Written Opinion for related International Application No. PCT/US2008/077128 dated Feb. 27, 2009, in 12 pages.

Notice of Reasons for Rejection dated Feb. 19, 2013 issued for related JP Patent Application No. 2010-526030 (and English translation), in 7 pages.

Notice of Reasons for Rejection dated Dec. 17, 2013 issued for related JP Patent Application No. 2010-526030 (and English translation), in 5 pages.

Notice of Reasons for Rejection dated May 27, 2014 issued for related JP Patent Application No. 2013-168823 (and English translation), in 5 pages.

Supplementary European Search Report dated Nov. 15, 2011 for related European Patent Application No. 08832405.8, in 5 pages.

* cited by examiner

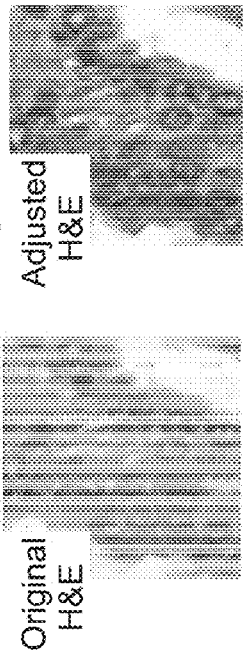
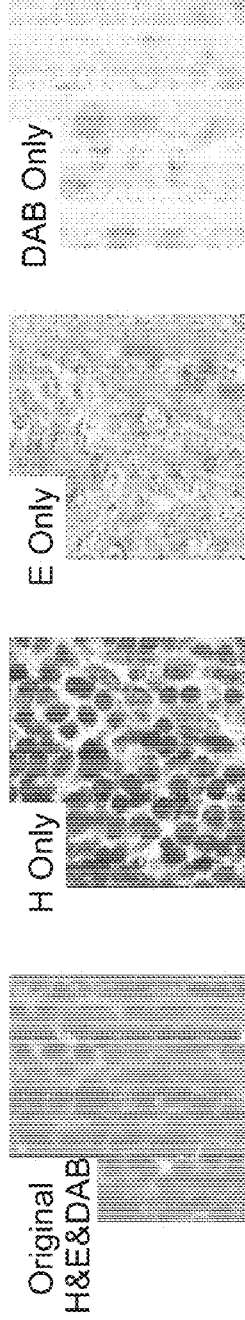
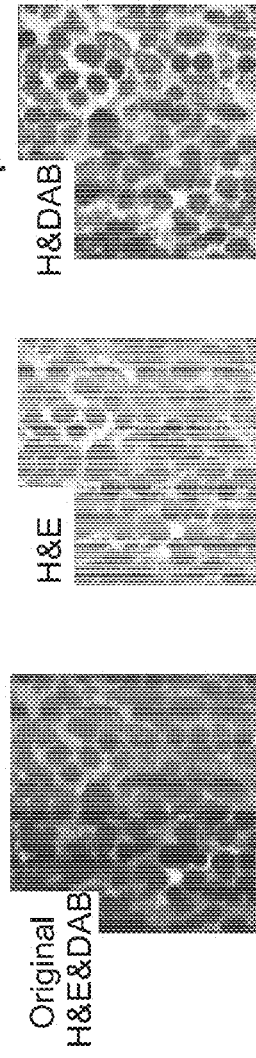
Figure 13

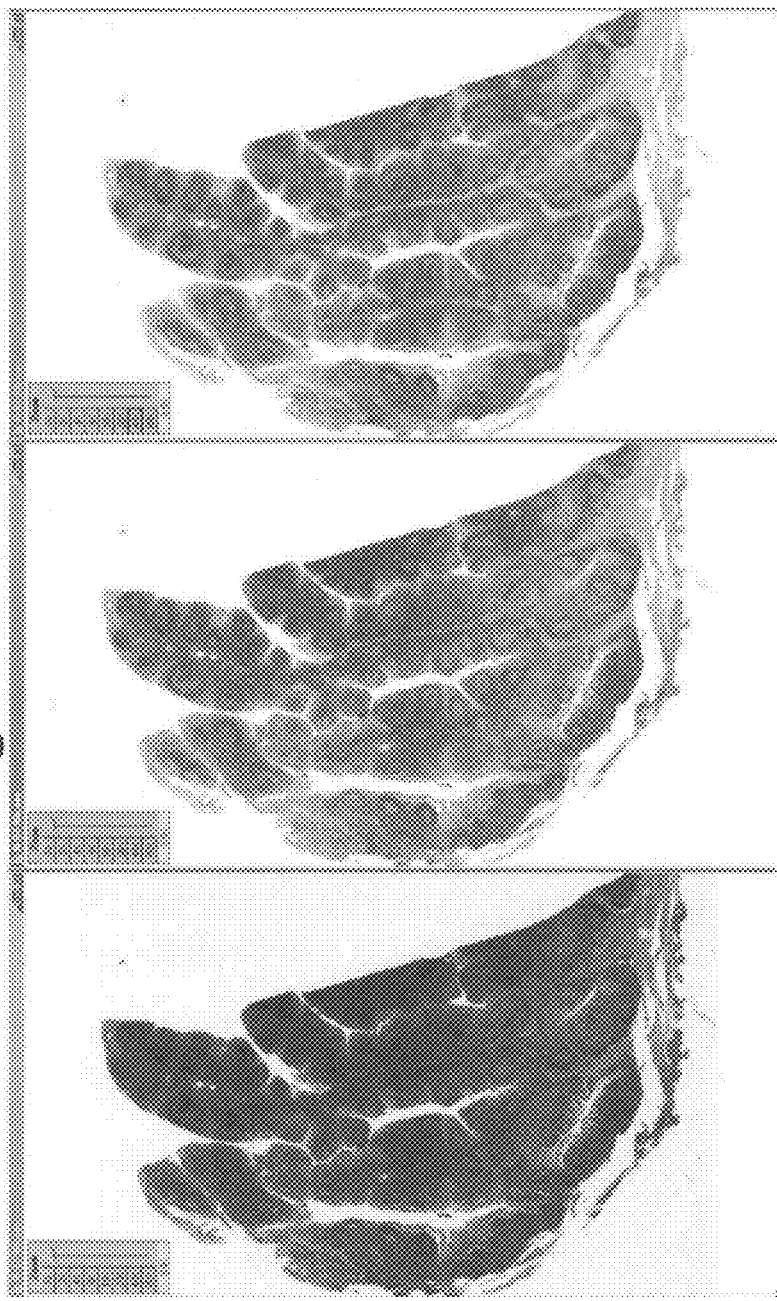

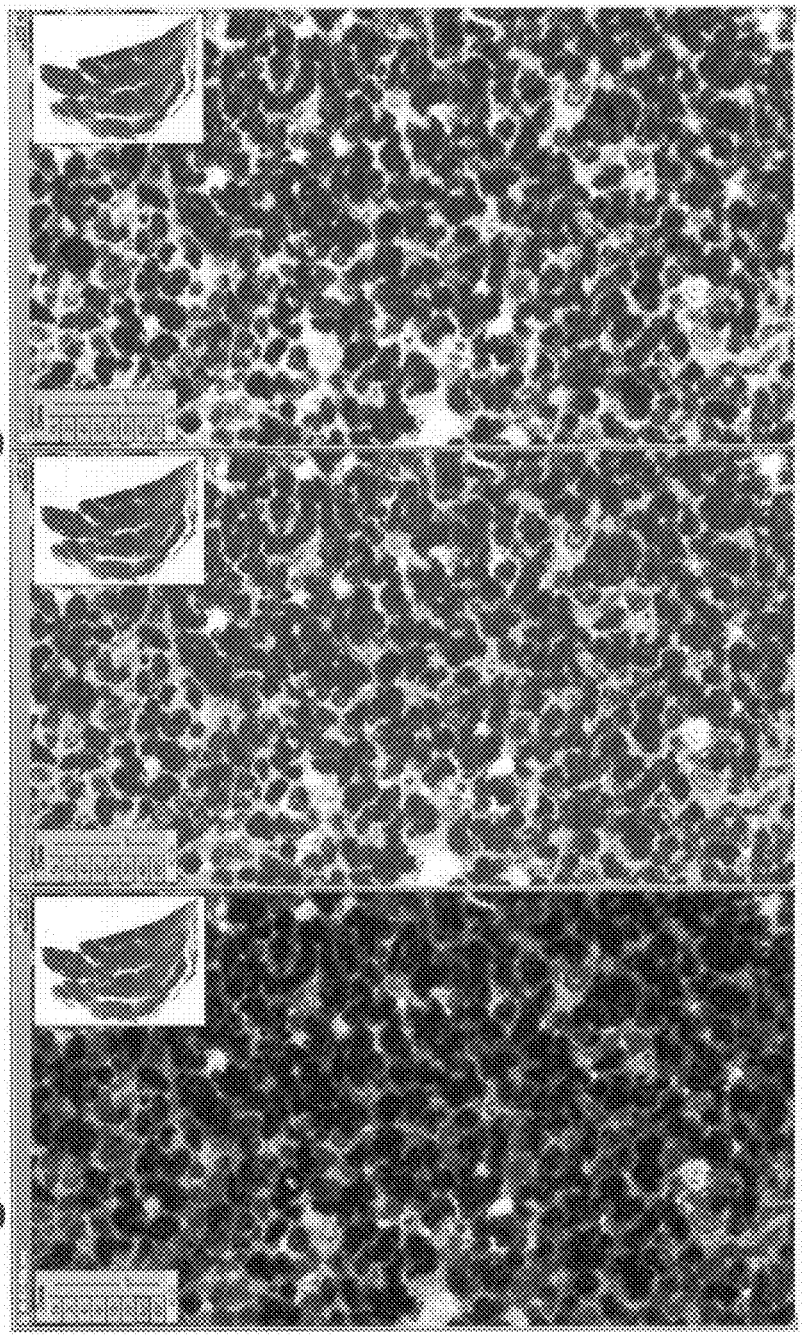

IMAGE QUALITY FOR DIAGNOSTIC RESOLUTION DIGITAL SLIDE IMAGES

RELATED APPLICATION

The present application is a divisional of U.S. patent application Ser. No. 12/234,446, filed Sep. 19, 2008, now U.S. Pat. No. 9,098,736, issued Aug. 4, 2015, which claims the benefit of U.S. provisional patent application Ser. No. 60/974,337 filed Sep. 21, 2007, each of which is incorporated herein by reference in its entirety.

BACKGROUND

Field of the Invention

The present invention generally relates to the field of digital pathology and more specifically relates to systems and methods for improving the image quality of a digital slide image for diagnostic resolution.

Related Art

While scientific measures such as modulation transfer function ("MTF"), resolution and the signal to noise ratio ("SNR") can be used to objectively quantify image capture devices, it is relatively difficult to objectively assess the quality or interpretability of the imagery data that is generated by such devices, particularly when the imagery data is destined to be subjectively examined by a human, for example in the evaluation of digital slide images in pathology.

Furthermore, the challenges associated with assessing image quality and/or interpretability are exacerbated for digital slide images that are read by pathologists because digital slides are extraordinarily large, typically multiple gigabytes in size. This significant amount of imagery data makes it very difficult to examine every area of a digital slide at full resolution to determine its quality and/or interpretability. Additionally, the patterns (i.e., the features and clues) that pathologists look for when making a diagnosis vary between tissue types and this is further confounded because there is no formal agreement among pathologists about the criteria and tasks used to make diagnoses of specific tissue types. Further, analysis of digital slide images and diagnosis based on digital slide images is made difficult by weak stains that result in faint coloring, strong stains that result in heavy coloring, non-standardized digital image characteristics of stains, similarly colored stains in a single slide, stains with low contrast to each other on a single slide, and poorly physical slide preparation. Therefore, what is needed is a system and method that provides improved quality and/or interpretability of a digital slide image to overcome these significant problems as described above.

SUMMARY

Described herein are systems and methods for improving the diagnostic resolution of digital slide images. In one embodiment a digital slide image is received, for example scanned, at diagnostic resolution and then deconvolved into separate images with one stain per image. Deconvolution can refer to the process of reversing the interaction of two or more colored stains on tissue.

The single stain images are then enhanced with image adjustments and/or processed with image analysis algorithms. The resulting single image data sets from the image analysis algorithms can then be stored. Additionally, the resulting enhanced single images can be recombined into a second digital slide image at diagnostic resolution that is also enhanced.

In one embodiment of a method for improving diagnosis of digital slide images, a first image of a tissue sample is scanned at diagnostic resolution. The image of the tissue sample can comprise a plurality of stains, for example Haematoxylin, Eosin or Diaminobenzidine ("DAB"). Staining procedures used to highlight structures in a tissue or cell usually involve techniques that use dyes such as Haematoxyylin, Eosin or DAB. The image of the tissue is deconvloved into a plurality of single images and image adjustments are made on one or more of the plurality of single stain images. The one or more of the plurality of single stain images can then be combined into a second image at diagnostic resolution, where the second image is an improved digital image. In one embodiment, the plurality of single stains images can remain separate for viewing.

In some embodiments the image adjustments include digital recolorization of a stain on a single stain image. This can result in higher quality digital images for more objective diagnosis and improve quality of image analysis algorithm results. In other embodiments, the one or more of the plurality of single stain images can be processed with one or more image analysis algorithms or image quality algorithm. The image quality algorithm can successfully separate the individual stains, digitally adjust each stain independently and recombine them in pairs to present the digital slides. The use of the IQ algorithm can produce digitally enhanced stains, a reduction in samples used, automatic co-location of multiple stains, for example hematoxilin and eosin ("H&E") with H&DAB, thereby accelerating review, saving preparation time and time spent requeing the number of glass slides and storage. The image quality algorithm can also configure for any two or three stained sample, for example H&E with H&DAB or H&E&DAB. The image quality algorithm also performs digital stain adjustments for stain normalization including dilution/concentration, removal of background staining, cellular detail emphasis, chromogen tuning and remapping.

In another embodiment of the system, a server comprises a deconvolution module, a recombination module, an adjustment module and a receiving module, for example a scanner module. The server can be configured with a data storage area and a scanner module to scan a first image into the system. While the scanner module is included in the server, it can also be a separate entity. The deconvoultion module is employed to deconvolve a first image into a plurality of single images. The goal of deconvolution is to recreate the signals or images as if the slide were only stained each stain singularly. Deconvolution occurs after image acquisition, and uses algorithms to extract information out of, for example, blurred regions of an image to clean up these regions. The recombination module can be configured to recombine one or more of the plurality of single stain images into a second image at diagnostic resolution. The adjustment module can be configured to make image adjustments on one or more of the plurality of single stain images. In one embodiment, the adjustments can be predefined for a given test and then automatically applied. In another embodiment the adjustment module can be configured to receive adjustment instructions from a user, where the user can make adjustments for just the current instance of viewing, for example. In some embodiments the user can make adjustments and save the adjustments as a default preset for a particular test. In other embodiments, the adjustments can vary with scan or view resolution. These adjustment instructions can be the basis for image adjustments on one or more of the plurality of single stain images. The adjustments can also vary with scan or view resolution. The server can also include a processor to process one or more of the plurality of single stain images with one or more image analysis algorithms or image quality algorithm. The data resulting from the image analysis algorithms can be stored in the data storage area.

A significant advantage of the described systems and methods is that they provide a pathologist or clinician with improved image quality digital slides that facilitate certain types of diagnostic or interpretative tasks. For example, the system and method provides for single stain digital adjustments such as boosting weak stains, diluting strong stains, removing background staining, standardization of digital image characteristics of stains, recolorization of stains (e.g., to primary colors having higher contrast than actual stains used), personalized staining (e.g., based on preference of an individual pathologist), spatial filtering on single stain images, segmentation and quantification on single stain images (e.g., counting nuclei in a Progesterone_receptor ("PR"), support new multiplex reagent with multichannel detection or spectral imaging detector (e.g., ER/PR on same slide and other dual or triple stains—reduces the need for two or more physical slides to be stained, provides advantage over separate slides with inexact physical samples) and novel methods of visualization.

In one embodiment, the method for improving diagnosis of digital slide images includes scanning a first image of a tissue sample at diagnostic resolution where the tissue sample can include a plurality of stains. Deconvolving the first image into a plurality of single images and making image adjustments on one or more of the plurality of single stain images. One or more of the single images can also be combined into a second image at diagnostic resolution. In some embodiments the resulting improved digital image can be rated. The image adjustment can be a digital recolorization of a stain on a single stain image where recolorization can provide (a) higher contrast; (b) personalization; (x) normalization or standardization of stains (c) identifying events/areas of interest (e.g., rare events, ER/PR co-location). In another embodiment the method for improving diagnosis of the digital slide images includes scanning a first image of a tissue sample at diagnostic resolution where the tissue sample comprising a plurality of stains. The first image can be deconvolved into a plurality of single images. In addition the one or more of the plurality of single stain images can be processed with one or more image analysis algorithms. The data resulting from the image analysis algorithms can be stored in a storage medium.

Development of New Reagents (Stains): In one embodiment, the reagents can be optimized for digital scanning at a diagnostic resolution. An example of an optimized reagent can be achieved by developing new protocols for use of conventional and new reagents to optimize the sample for being digitally scanned at a diagnostic resolution (e.g., multiplex reagents or single reagent). In an embodiment new reagent systems (for example, stains) can be optimized for digital pathology, e.g., produce better quality digital images when scanned at diagnostic resolution. Among other IQ elements, the process can include deconvolving the new reagent and also New/optimized reagent protocols in combination with deconvolution. In one embodiment the process can include linking the properties of the reagent and the light passing through the stained tissue into the pixel sensors on the camera (e.g., optimizing the reagent(s) into the RGB channels.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 13 is a diagram illustrating an example of IQ Algorithm Presentation Modes.

FIGS. 14-17 are diagrams illustrating examples of multiple image quality presentations.

DETAILED DESCRIPTION

Certain embodiments as disclosed herein provide for systems and methods for improving diagnostic resolution of digital slide images. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
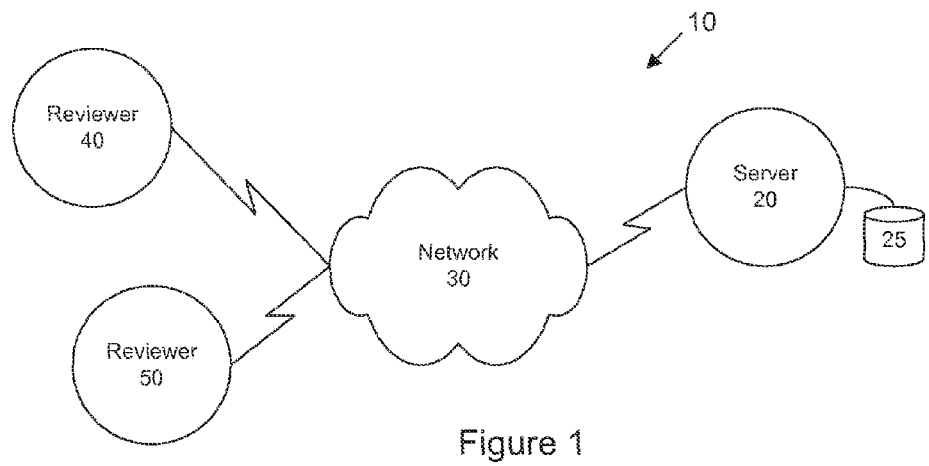
FIG. 1 is a network diagram illustrating an example system for image interpretability assessment according to an embodiment of the present invention.

FIG. 1 is a network diagram illustrating an example system 10 for image interpretability assessment according to an embodiment of the present invention. In the illustrated embodiment, the system 10 comprises an image server 20 that is communicatively coupled with reviewer device 40 and reviewer device 50 via a network 30. The image server 20 is configured with a data storage area 25.

The image server 20 can be implemented using a conventional computer device and is configured to maintain in the data storage area 25 a plurality of digital slide images, for example digital images of physical tissue samples on microscope slides. These digital slides can be in any of a variety of image formats and data formats. The server also maintains in data storage area 25 various program modules that can be used to facilitate and implement the functions for assessing image interpretability. For example, modules for obtaining portions of digital slide imagery data, modules for executing image analysis algorithms on portions of digital slide imagery data, and other modules can be maintained by the image server 20 in data storage area 25.

The data storage area 25 can be any sort of internal or external memory device and may include both persistent and volatile memories. The function of the data storage area 25 is to maintain data (e.g., image data and operational modules) for long term storage and also to provide efficient and fast access to instructions for applications that are executed by the server 20.

The server 20 and the reviewers 40 and 50 are all communicatively coupled with the network 30. The network 30 is configured for data communications (e.g., between server 20 and reviewer 40) over a wide geographical area and can be communicatively coupled with one or more public or private networks (not shown), which may include that particular aggregation of networks commonly known as the Internet.

The reviewers 40 and 50 can also be implemented using a conventional computer device or other communication device with the ability to connect to the network 30. For example, the reviewers 40 and 50 can include any of a variety of communication devices including a wireless communication device, personal digital assistant ("PDA"), personal computer ("PC"), laptop computer, PC card, special purpose equipment, or any combination of these and other devices capable of establishing a communication link over network 30 with the server 20. The reviewers 40 and 50 may be configured with data storage areas (not shown) and their primary function is to present digital slide information to an analyst (e.g., a pathologist or technician) and pass input from the analyst to the server 20.

Figure 2:
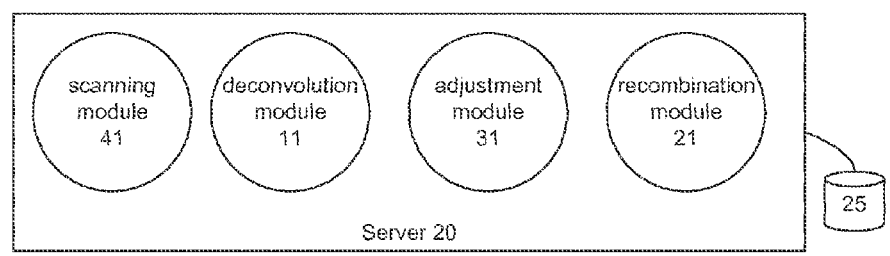
FIG. 2 is a block diagram illustrating an example server to perform improved diagnostic resolution for digital slide images according to one embodiment of the present invention.

FIG. 2 is a block diagram illustrating an example server 20 for performing diagnostic resolution for digital slide images. In the illustrated embodiment, the server 20 comprises a deconvolution module 11, a recombination module 21 and an adjustment module 31 and a scanner module 41. The server 20 can be configured with a data storage area 25 as described above. In one embodiment, the server can also include an image analysis module.

The scanner module 41 is configures scan a first image into the system. While the scanner module 41 is included in the server 20, it can also as a separate entity. The deconvoultion module 11 is employed to deconvolve a first image into a plurality of single images. The goal of deconvolution is to recreate the signal or image as it existed before the convolution took place. Deconvolution occurs after image acquisition, and uses algorithms to extract individual stain images. The recombination module 21 can be configured to recombine one or more of the plurality of single stain images into a second image at diagnostic resolution. The adjustment module 31 configured to make image adjustments on one or more of the plurality of single stain images. In one embodiment the adjustment module 31 includes a reviewer 40, illustrated in FIG. 1, which can be configured to receive adjustment instructions from a user. These adjustment instructions can be the basis for image adjustments on one or more of the plurality of single stain images. The adjustment module can be configured to make image adjustments on one or more of the plurality of single stain images. In one embodiment, the adjustments can be predefined for a given test and then automatically applied. In another embodiment the adjustment module can be configured to receive adjustment instructions from a user, where the user can make adjustments for just the current instance of viewing, for example. In some embodiments the user can make adjustments and save the adjustments as a default preset for a particular test. In other embodiments, the adjustments can vary with scan or view resolution. These adjustment instructions can be the basis for image adjustments on one or more of the plurality of single stain images. In one embodiment the server further comprises a processor 41 to process one or more of the plurality of single stain images with one or more image analysis algorithms. The data resulting from the image analysis algorithms can be stored in the data storage area 25.

Figure 3:
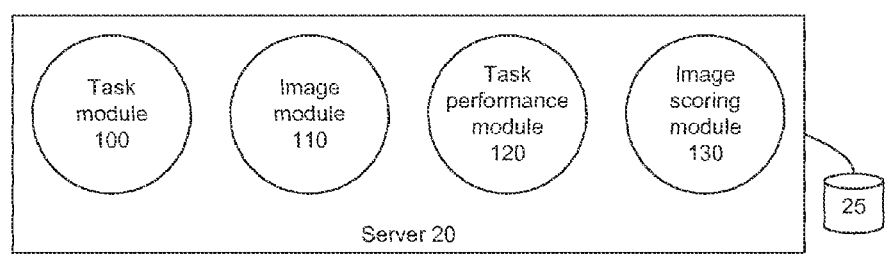
FIG. 3 is a block diagram illustrating an example server for image interpretability assessment according to an embodiment of the present invention.

FIG. 3 is a block diagram illustrating an example server 20 for image interpretability assessment according to an embodiment of the present invention. In the illustrated embodiment, the server 20 comprises a task module 100, an image module 110, a task performance module 120, and an image scoring module 130. The server 20 is again configured with a data storage area 25 as described above. A set of tasks created in the task module is can be used or implemented in the adjustment module 31 to make image adjustments on one or more of the plurality of single stain images.

The task module 100 is employed to create and maintain one or more sets of tasks. The sets of tasks can be tissue type specific, for example a first set of tasks may be required for analysis of a tissue sample, while a second set of tasks may be required for analysis of a blood sample. In certain cases, individual tasks within the various sets of tasks may overlap. The sets of tasks may be established by a standards body or other similar group and an individual task, for example, may include the diagnostic tasks and criteria that would be performed using conventional microscopy by a board-certified pathologist who is familiar with the particular tissue type and stain that appears in the digital slide image. The set of tasks created in the task module can be used or implemented in the adjustment module 31 to make image adjustments on one or more of the plurality of single stain images.

Because a digital slide provides instant access to many intermediate image resolution levels—from thumbnail image (lowest resolution image) to full-resolution baseline image (highest resolution quality)—a more meaningful rating scale is created by selecting tasks that can be accomplished at high image resolution, e.g., using a microscope at high power (for example, with a 40×/0.75 objective lens). Advantageously, the image quality rating is however improved by utilizing the IQ Algorithm. The selection of criteria and tasks is tissue-specific and including tasks that can be accomplished at lower image resolutions may be appropriate for some tissue types (e.g., dermatopathology). By comparison, an image interpretabilty rating scale aimed at hematopatholgy specimens, should reflect criteria and tasks that correspond to oil-immersion resolutions; for example using a 100×/1.4 objective lens. In general, higher resolution images have higher image quality when focus and illumination and other image capture attributes are relatively equal.

Figure 15:
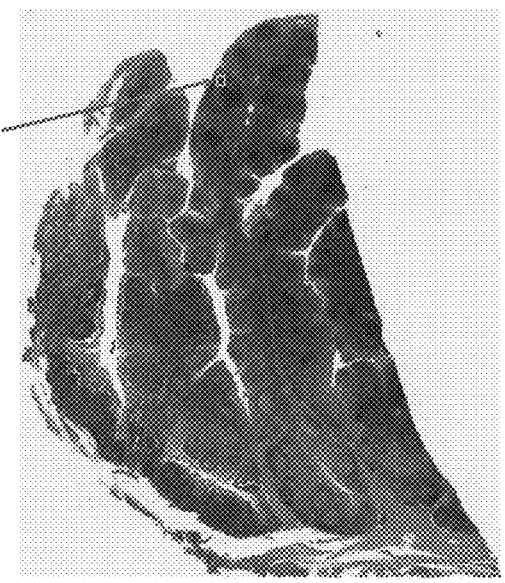

A list of potential tasks and criteria is provided in the table below for a prostate cancer specimen:
1. Identify areas of overlapping cores
2. Identify red blood cells in vessels
3. Identify corpora amylacea 4. Distinguish between a Gleason grade 3 and Gleason grade 5 pattern
5. Distinguish between nerve tissue and stroma
6. Identify individual muscle bundles
7. Detect the "pink-colored" secretions of normal prostate glands
8. Detect the presence of the "amphophilic cytoplasm" of malignant prostate glands
9. Identify the basal layer of a prostate gland
10. Detect the presence of nucleoli
11. Count the number of nuclei within a gland
12. Detect the borders of luminal cells
13. Detect the presence of "blue-tinged mucus
14. Detect the presence of mitotic figures
15. Count the number of endothelial nuclei within a vessel
16. Detect the presence of lipofuschin/pigment
17. Approximate the diameter of a nucleus to within 2 μm
18. Detect clear cut nuclear envelope borders
19. Identify individual nerve fibers
20. Detect the concavity of individual red blood cells
21. Identify the individual lobes of a neutrophils
22. Identify individual striations in muscle fibers
23. Distinguish between the nucleus of stromal fibroblast and a lymphocyte
24. Distinguish between "normal" and "abnormal" mitotic figures
25. Identify individual nucleoli within a multi-nucleolated cell In one embodiment, the criteria and tasks for specific tissue types are established by consensus among pathologists, with some criteria being common among different tissue types. These criteria are then provided to the task module 100 and stored in the data storage area 25. While some pathologists may disagree about including or excluding certain tasks or criteria, organizations like the College of American Pathologists ("CAP") may advantageously publish and standardize the generally accepted tasks and criteria for different tissue types.

The image module 110 is configured to obtain imagery data from a digital slide. The digital slide may be stored locally or remotely and may be accessed through a separate database or be integrated with a database under the operation of the image module 110. Starting from scratch, the image module may facilitate the scanning of a glass slide to create a digital slide image at the required resolution for accomplishing the criteria and tasks for the particular tissue type. Alternatively, the image module 110 may obtain imagery data at the required resolution via a network server, remote storage area, or local data storage area 25. In one embodiment using prostate cancer biopsies, the required scanning resolution is achieved by use of a 40×/0.75 objective lens, which corresponds to a 0.25 μm per pixel scanning resolution.

The task performance module 120 is configured to manage the performance of the various tasks that are required in the set of tasks for the particular tissue type. In one embodiment, the task performance module provides portions of imagery data from the digital slide image to the display screen of a reviewer device so that an analyst (e.g., a technician or pathologist) may analyze the portions of imagery data to perform each task in the set of tasks corresponding to the particular tissue type. The task performance module 120 also records the success or failure of the analyst in performing the task. This may be accomplished by presenting a dialogue box to the analyst with a binary input capability that allows the analyst to register whether the task was successfully performed or not successfully performed.

Alternatively, or in combination, the task performance module may employ one or more computer implemented image processing algorithms that are capable of analyzing imagery data from a digital slide to perform a particular task. For example, an image processing algorithm capable of counting the number of cells in a specimen may be used to determine whether there is sufficient contrast and resolution in the imagery data to separately identify individual cells. Thus, successfully being able to count the number of cells in a tissue sample may result in the task performance module 120 recording as successful the task for being able to separately identify individual cells. Advantageously, as more sophisticated and robust image processing algorithms are developed, fewer tasks may need to be performed by analysts, thus decreasing the time to score digital slide images and improving the reliability of predictable and repeatable scoring through elimination of the human element.

In one embodiment, the task performance module 120 measures an analyst's ability to perform each of the diagnostic tasks and criteria in the task list on representative portions of imagery data from a digital slide. This is accomplished by the task performance module 120 by selecting random portions of imagery data from the digital slide (so as to be representative of the entire area of the digital slide) or alternatively by selecting portions of imagery data from meaningful regions of the slide, which can be identified using a microscope (e.g., manually) or image processing algorithm (e.g., computer aided/automatically).

Notably, one goal of the image interpretability scale is to rank-order the diagnostic tasks and criteria based on the interpretability of the digital slide imagery. Accordingly, the selected fields of view (selected randomly or otherwise) preferably correspond to different image qualities, otherwise the scale will not have sufficient dynamic range and it will not be possible to differentiate the relative difficulty of achieving the criteria and tasks. In one embodiment, different image qualities for the same portion of a digital slide image can be obtained, for example, by sub-sampling the imagery data, by compressing the imagery data (and further by changing the quality factor during image compression), by scanning the glass slide at different resolutions, any by other means for simulating different image qualities.

The image scoring module 130 is configured to calculate, based on the success or failure of task performance, an image interpretability score. The score is calculated for each portion of a digital slide image that is examined by an analyst (or image processing algorithm). A separate score may also be calculated for various regions of a digital slide and a further separate score may be calculated for the entire digital slide. In one embodiment, entire digital slide scores are calculated from the respective scores of individual portions of imagery data, or from the respective scores of individual regions of imagery data (comprising a plurality of portions), or from a combination of individual portions and regions of imagery data.

Advantageously, a single digital slide may have multiple scores associated with it, including scores for portions, regions, and the entire slide at the scanning resolution, as well as scores for portions, regions, and the entire slide at reduced intermediate resolutions all the way down to the smallest resolution thumbnail image of the entire slide (and portions and regions thereof).

Figure 4:
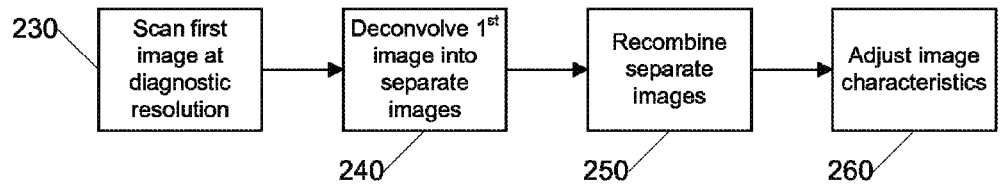
FIG. 4 is a flow diagram illustrating an example process for improved diagnostic resolution for digital slide images according to one embodiment of the present invention.

FIG. 4 is a flow diagram illustrating an example process for improved diagnostic resolution for digital slide images according to one embodiment of the present invention. In this embodiment, a first image of a tissue sample is scanned at diagnostic resolution (230). The image of the tissue sample can comprise a plurality of stains, for example hemattoxilin, eosin or DAB. The image of the tissue is deconvloved into a plurality of single images (240). Subsequently image adjustments are made on one or more of the plurality of single stain images. The one or more of the plurality of single stain images can then be combined into a second image at diagnostic resolution (250), where the second image is an improved digital image. The improved digital image can be rated with a rating scale for image interpretability in anatomic pathology. In some embodiments the image adjustment (250) is performed, which may include digital recolorization of a stain on a single stain image. Recolorization can provide higher contrast, personalization, identifying events/areas of interest (e.g., rare events, ER/PR co-location).

Figure 5:
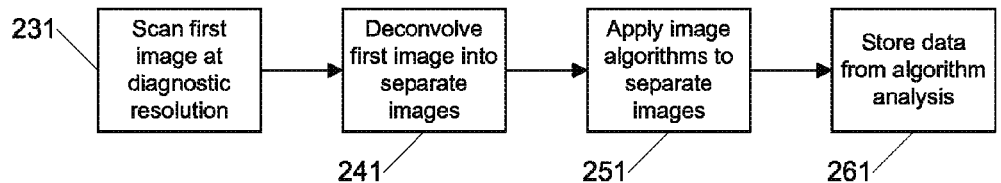
FIG. 5 is a flow diagram illustrating another example process for improved diagnostic resolution for digital slide images according to one embodiment of the present invention.

FIG. 5 is a flow diagram illustrating another example process for improved diagnostic resolution for digital slide images according to one embodiment of the present invention. In this embodiment a first image of a tissue sample is scanned at diagnostic resolution (231). The tissue sample or image can comprise a plurality of stains, for example hemattoxilin, eosin or DAB. The image of the tissue is then deconvloved into a plurality of single images (241). The one or more of the plurality of single stain images are then processed with one or more image analysis algorithms or image quality algorithm (251). The image quality algorithm can successfully separate the individual stains, digitally adjust each stain independently and recombine them in pairs to present or store (261) the digital slides.

In one embodiment, N slides that contain serial sections of a tissue block that are stained for different tests (for example H&E, ER, PR) can be decomposed or stain separated, adjusted, recolored and the stain channels can be combined from the different slides. Thus, instead of separating an H&E&DAB into an H&E and H&DAB the H&E and H&DAB can be combined to form H&E&DAB. The IQ algorithm can be configured with a viewing mode that allows a user, for example a pathologist, can overlay one view on another. For example when viewing during an H&E review, the pathologist can turn on the DAB view overlaying the H & E view. Another example includes taking a combination of ER of H&DAB and PR of H&DAB where both the DAB are brown and modifying the PR's DAB to green and creating the ER of H&DAB with the PR's green DAB overlayed. In one embodiment, the overlaying process can require image registration between the N slides. The use of the IQ algorithm can result in digitally enhanced stains, a reduction in sample used, automatic co-location of multiple stains, for example H & E with H & DAB, thereby accelerating review, saves preparation time and reduces the number of glass slides and storage. The image quality algorithm can also configure for any two or three stained sample, for example H & E with H & DAB or H & E & DAB. The image quality algorithm also performs digital stain adjustments for stain normalization including dilution/concentration, removal of background staining, cellular detail emphasis, chromogen tuning and remapping. The data resulting from the image analysis algorithms can be stored in memory 25, for example. The IQ Algorithm can be configured to operate synchronously with viewing of the images or with display updating. Thus the images resulting from the IQ algorithm can be viewed or displayed (for example in viewing or display mode) without user intervention. Further the display updating feature can allow the images or stains to be updated synchronously with the operation of the IQ algorithm. These operations of the IQ Algorithm are stain specific or test specific. The IQ Algorithm can be configured to provide a digital viewing mode for viewing stains or images, including a side by side viewing.

Figure 6:
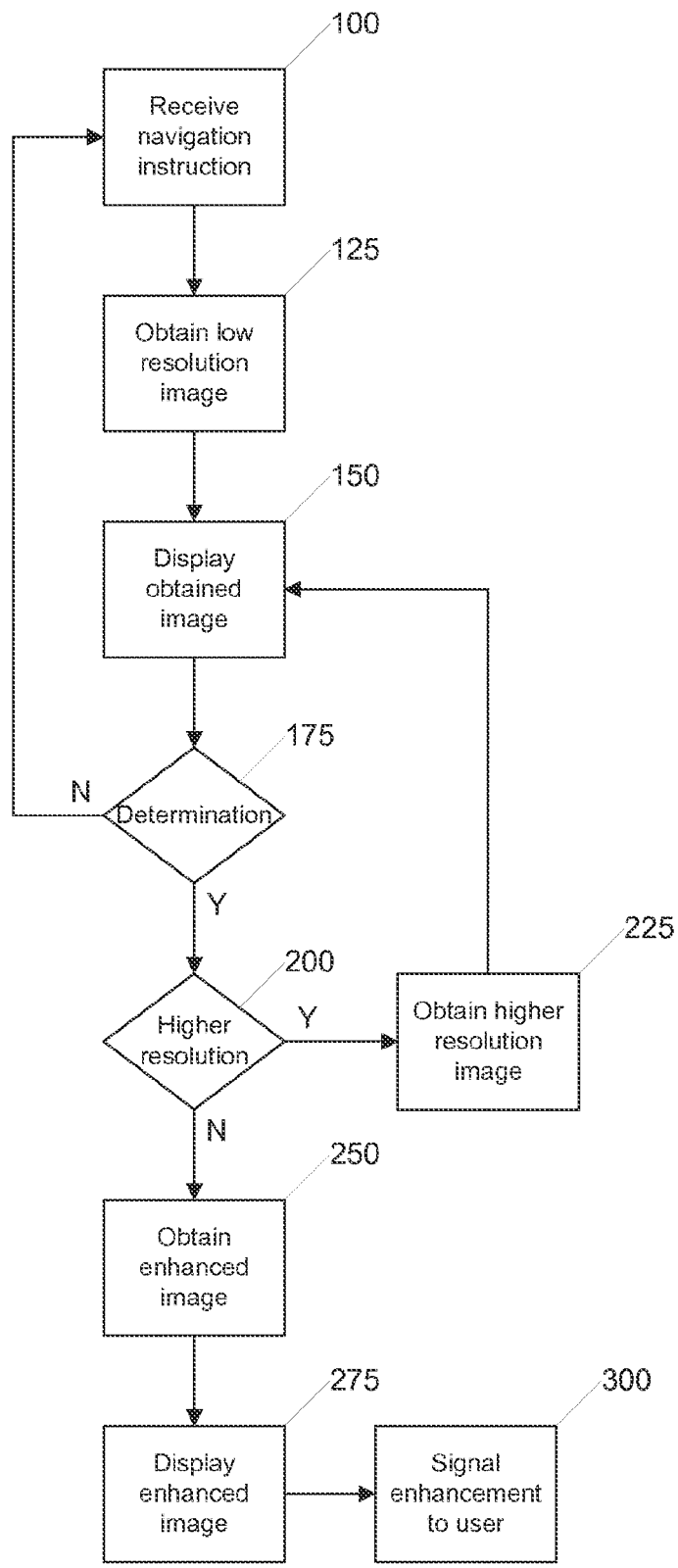
FIG. 6 is an example of a flow process for enhanced progressive rendering when viewing digital slide images of a tissue according to an embodiment.

FIG. 6 is an example of a flow process for enhanced progressive rendering when viewing digital slide images of a tissue according to an embodiment. This process may be implemented by a viewing station or an image server or a combination of these and other devices. Embodiments of the viewing station and/or image server can be implemented with a general purpose computer such as described below with respect to FIG. 18 and modules that carry out the steps of the process may be implemented in software or hardware.

Initially, in step 100 a navigation instruction is received. The navigation instruction may identify a portion of a digital slide image of a tissue that is desired to be viewed. Next, the in step 125 a low resolution image of the portion of the image to be viewed is obtained. This image data may be obtained from local memory or from an image server that is accessible via direct or indirect communication link. For example, an indirect communication link may comprise a network connection between a viewing station and an image server. In step 150 the obtained image is displayed.

In step 175, a determination is then made as to whether the resolution of the portion of the digital slide image of the tissue sample is acceptable based on an indicator. In one embodiment the indicator is indicated by a lapse of time. A predetermined threshold of time may be allocated for a displayed image with the acceptable resolution to be selected. Thus the time that the image is displayed is tracked and if the amount of time the image is displayed exceeds the predetermined threshold amount of time indicates that the resolution is unsatisfactory or unacceptable. When such a determination is made a higher resolution image of the same area of interest is then obtained in step 225 if such higher resolution image exists, as determined in step 200. Alternatively, if the predetermined threshold amount of time is not exceeded before a subsequent navigation instruction is received, then the process loops back to step 100 where the next navigation instruction is received in order to view a different area of interest.

If there is a higher resolution image that is subsequently displayed in step 150, the process loops through progressive rendering of higher resolution images as long as it is desired to focus on that particular area of interest. For example, a pathologist may focus on the particular area of interest without issuing a new navigation instruction. Once the highest resolution image has been displayed, if the pathologist continues to view the same area of interest, for example, then an enhanced image of the area of interest is obtained in step 250 and displayed in step 275. An enhanced image can be obtained according to the illustration of FIG. 4 and FIG. 5 above. Obtaining the enhanced image may include dynamically processing the current portion of the image to enhance the image. Alternatively, obtaining the enhanced image may also include fetching a preprocessed enhanced image from data storage.

Advantageously, an indicator may also be employed to signal to the pathologist that an enhanced image is being displayed, as shown in step 300. Such an indicator may be visual such as an icon that is highlighted or brightened when an enhanced image is being displayed and is darkened when a native image is being displayed. Alternatively, or in combination, an aural indicator may be used such as a sound that indicates the current view is an enhanced image.

One advantage of dynamically processing the image data is that the entire digital slide does not need to be preprocessed with the enhancement but instead only the portion of the image under review may be enhanced. As the pathologist navigates about the digital slide to regions of interest it is not always necessary to perform the image quality improvement algorithm(s). Instead the on-demand dynamic approach can be implemented such that when the pathologist dwells or focuses on a view, the enhanced view would be presented. Additionally, once an enhanced view has been created, for example in a dynamic embodiment, the enhanced view can be stored along with the digital image so that subsequent returns to the same area of interest will not require redundant image processing in order to present the enhanced view.

Note that the improved progressive rendering described with respect to FIG. 6 is only one embodiment for improving image quality for pathologists. In progressive rendering, a sequence of low to mid to high resolution images are presented to the viewer until the highest resolution is displayed or until the user navigates away from that view and restarts the rendering process. The improved progressive rendering may add enhanced images at any point during the sequence of low to mid to high resolution images, for example with the final presentation being an enhanced high resolution image of the area of interest.

Figure 7:
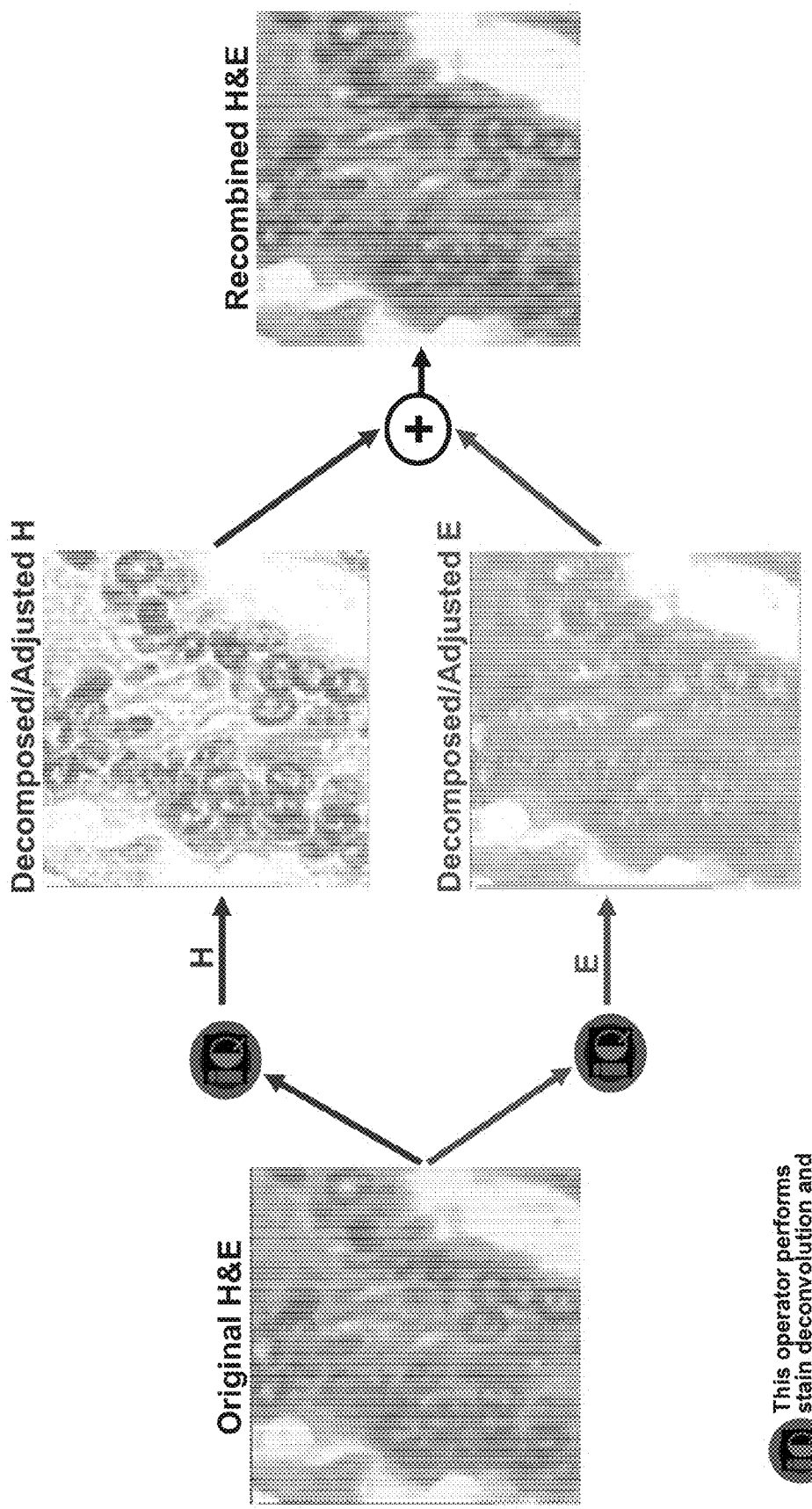
FIGS. 7-8 are block diagrams illustrating examples of images processed by an image quality algorithm.
Figure 8:
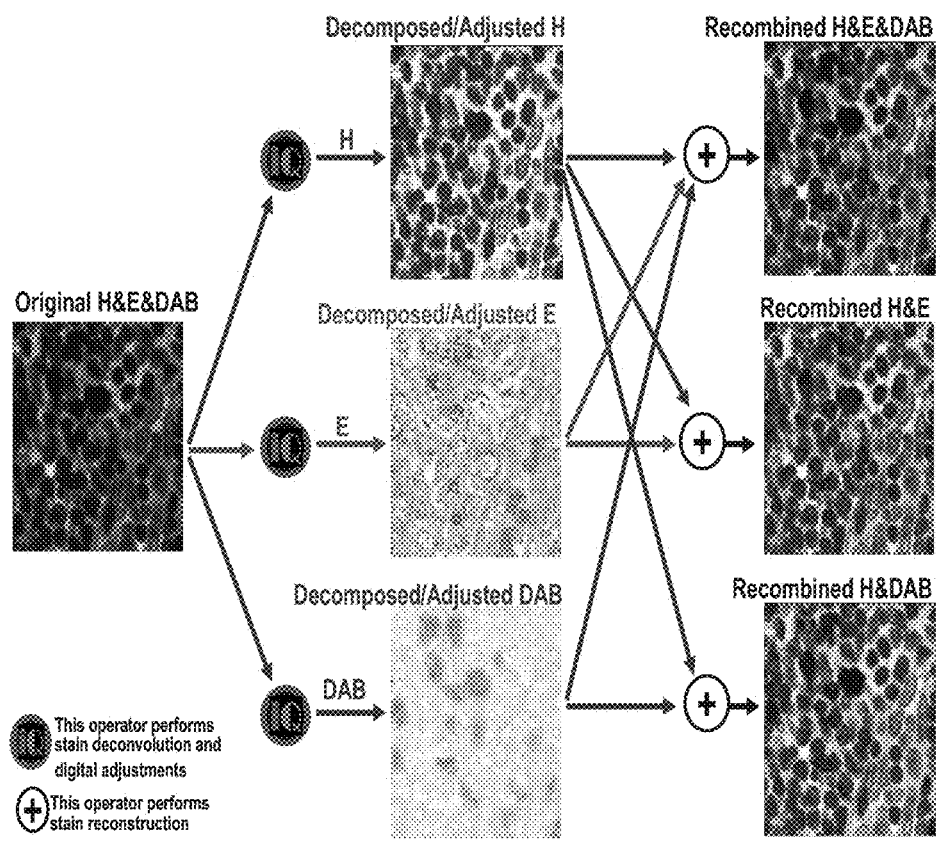
Figure 9:
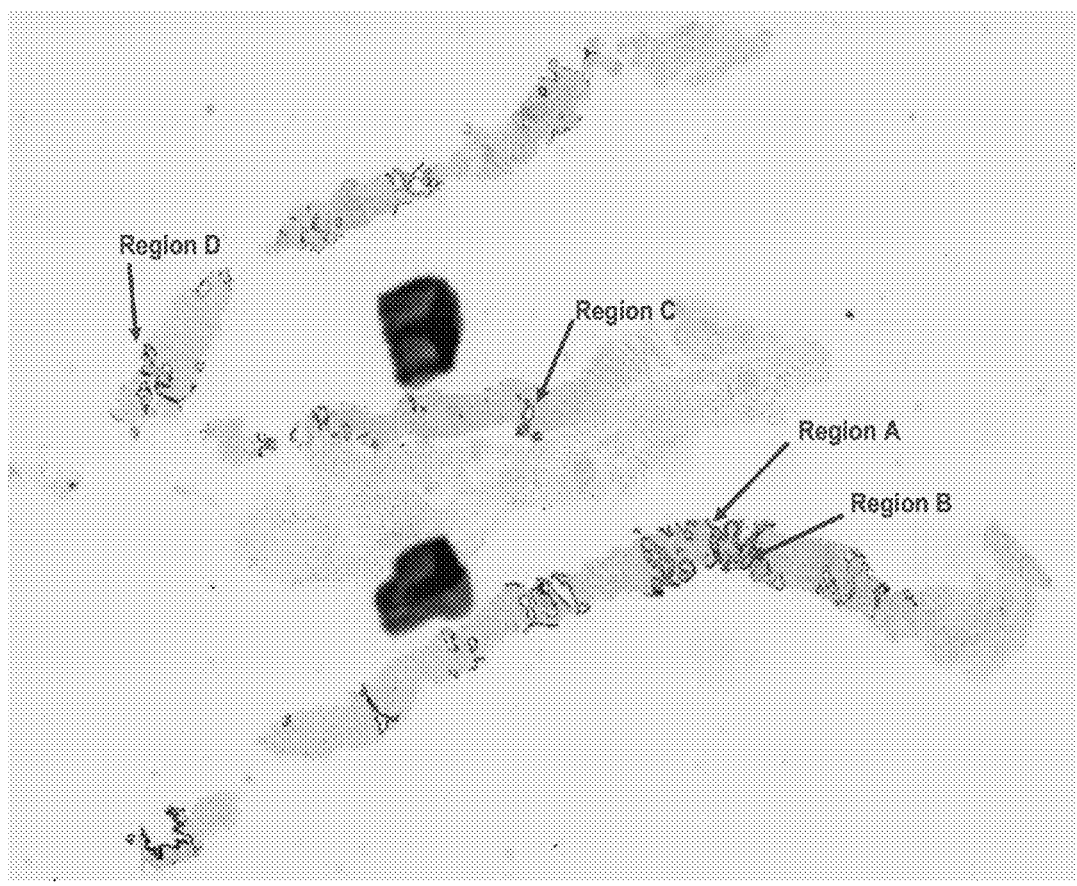
FIGS. 9-12 are diagrams illustrating example regions examined and collocation of markers and side by side viewing of the reconstructions.

FIGS. 7-8 are block diagrams illustrating examples of images processed by an image quality algorithm. FIG. 7 shows an original image that is decomposed into separate images, one for the H stain and one for the E stain. The H&E images are then recombined to provide an improved image. Similarly, FIG. 8 shows an original image broken down into three separate images that are then recombined into improved images having various combinations. Although all combinations of the single decomposed/adjusted images are not shown, all combinations can be created.

Figure 10:
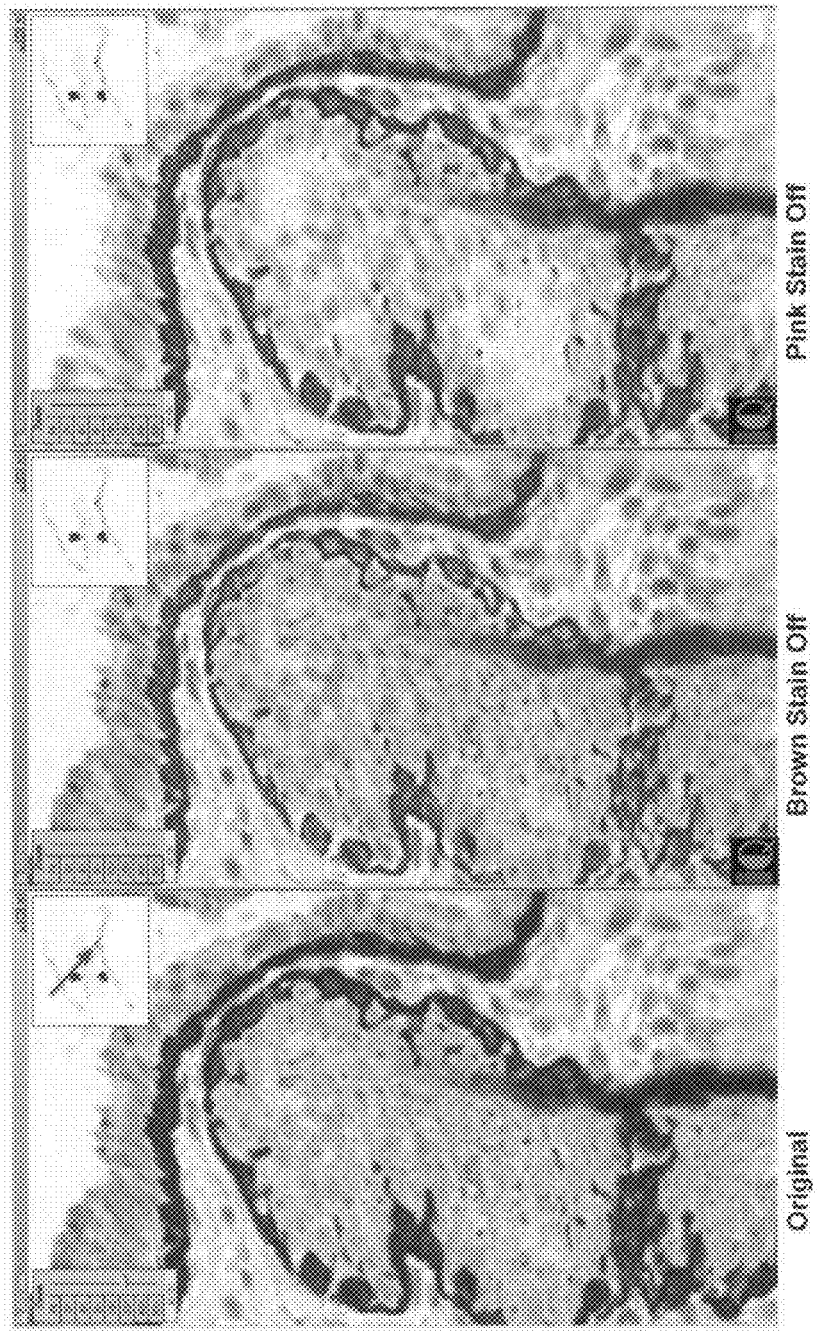
Figure 11:
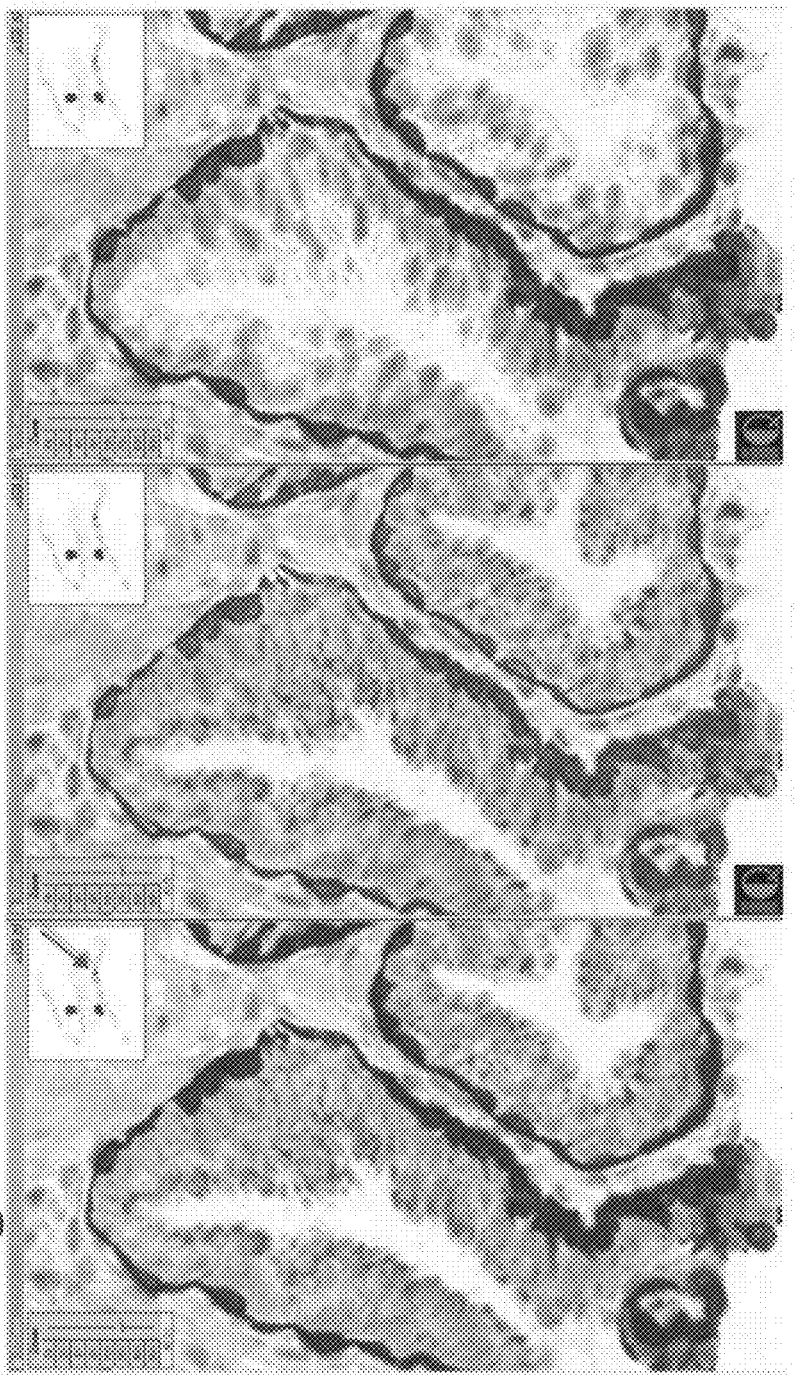
Figure 12:
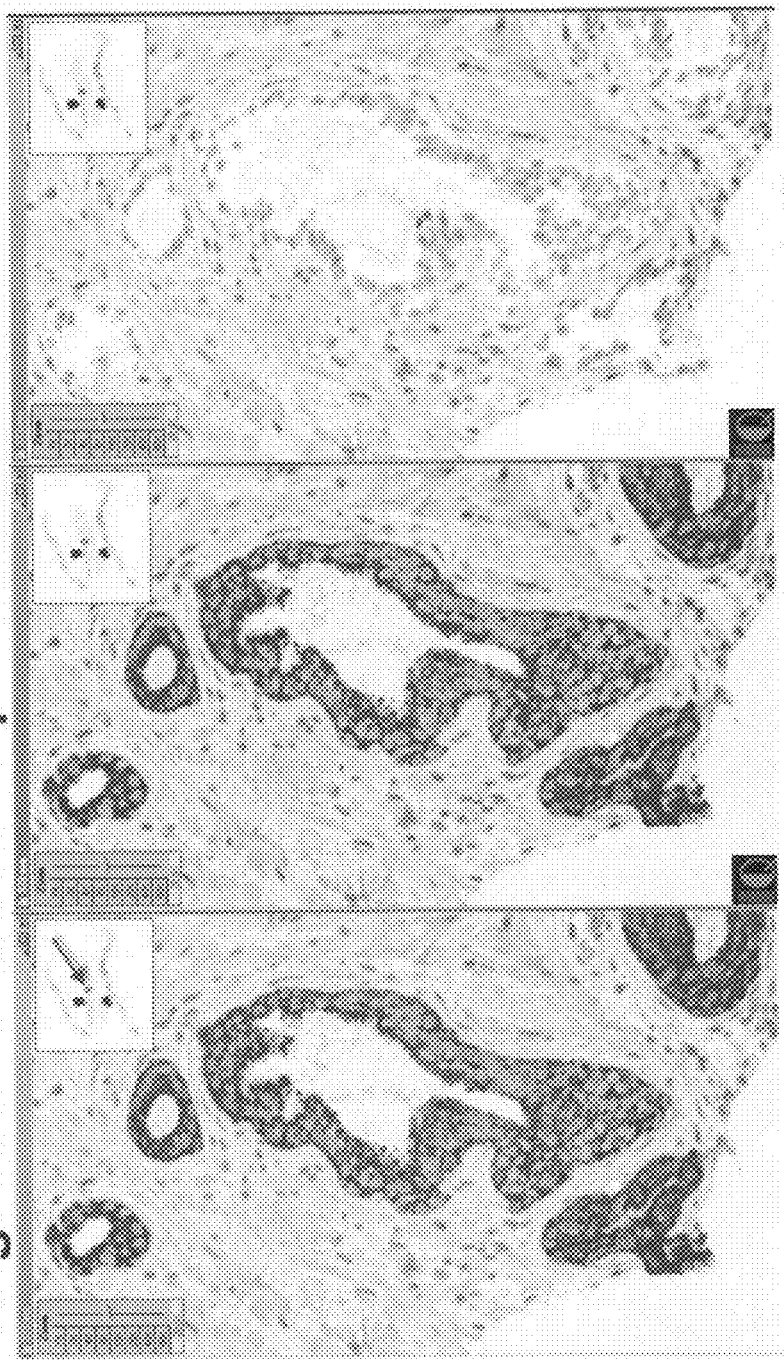
Figure 17:
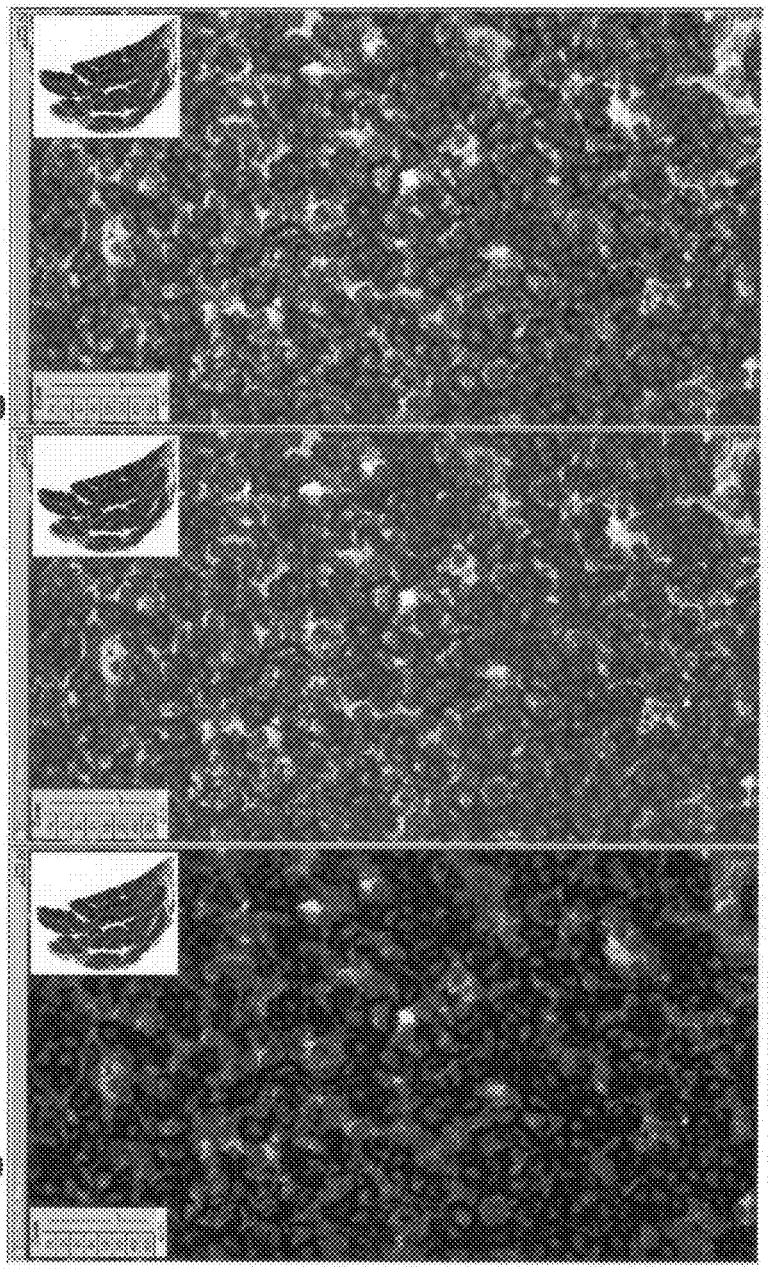

FIGS. 9-12 are diagrams illustrating example regions examined and collocation of markers and side by side viewing of the reconstructions. FIGS. 10-12 show a user interface having three views of the same region, including a view of the original digital image, a view of an enhanced digital image having the brown stain turned off, and a view of an enhanced digital image having the pink stain turned off. In one embodiment, turning off a stain can be accomplished by digitally removing one or more colors from the image.

FIG. 13 is a diagram illustrating an example flow of presenting IQ Algorithm images. Initially, the adjusted images are presented, then the deconvolved images having individual stains are presented, then the recombined images (in any combination) are presented.

FIGS. 14-17 are diagrams illustrating examples of multiple image quality presentations of original images and recombined images having different stains in various combinations (single or multiple stains).

Figure 18:
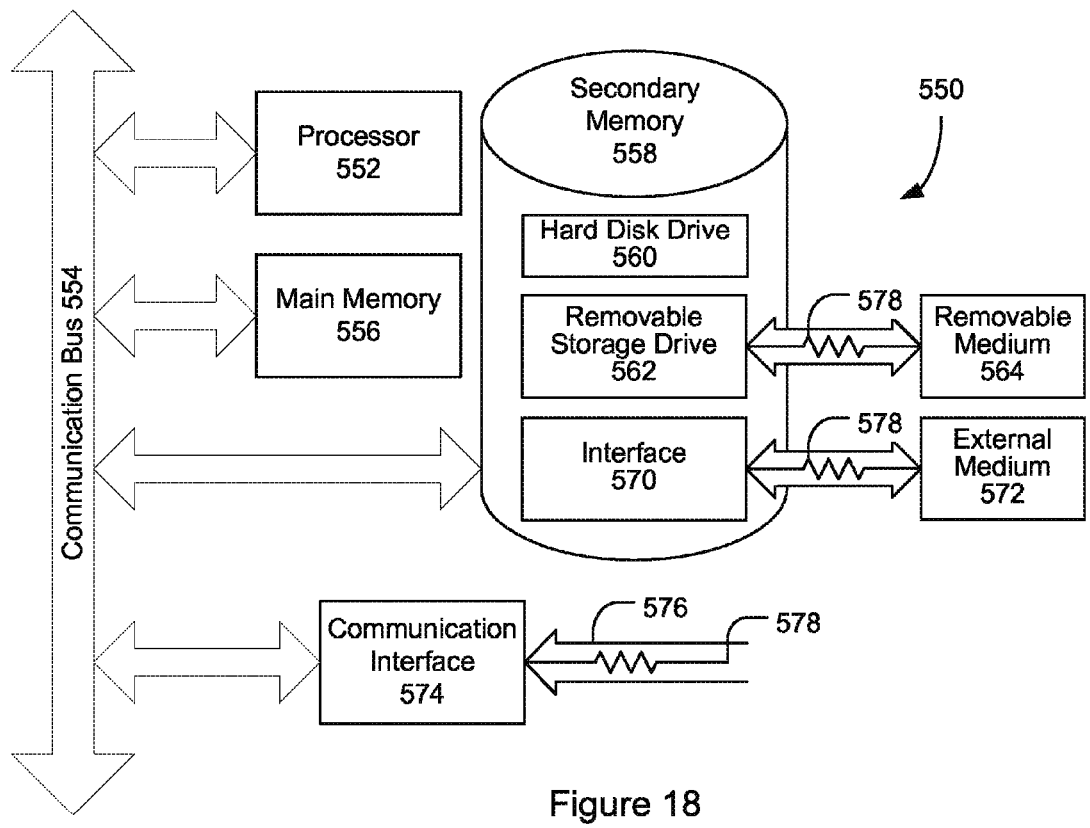
FIG. 18 is a block diagram illustrating an example computer system that may be used in connection with various embodiments described herein.

FIG. 18 is a block diagram illustrating an example computer system 550 that may be used in connection with various embodiments described herein. For example, the computer system 550 may be used in conjunction with the server or reviewer devices previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A computer implemented method for improving the image quality of a digital slide image comprising:
one or more processors performing steps comprising:
receiving a navigation instruction identifying at least one portion of a digital slide image of a tissue sample;
acquiring and displaying the identified at least one portion of the digital slide image of a tissue sample;
determining whether the resolution of the at least one portion of the digital slide image of a tissue sample is acceptable based on an indicator;
accepting the identified at least one portion of the digital slide image of a tissue sample when indicated that the resolution is acceptable; and
acquiring and displaying a higher resolution image of the at least one digital slide image of a tissue sample when it is determined that the resolution is unacceptable.

2. The method of claim 1 further comprising, receiving the acceptable identified at least one portion of the digital slide image of a tissue sample at diagnostic resolution.

3. The method of claim 1 further comprising, deconvolving the digital slide image into a plurality of single images having one stain type per single image.

4. The method of claim 1 further comprising, adjusting one or more of the plurality of single images with an image analysis algorithm to optimize the quality of the plurality of single images.

5. The method of claim 4 further comprising, recombining one or more of the plurality of optimized single images into a second digital slide image at diagnostic resolution.

* * * * *